United States Patent [19]

Anderson et al.

[11] Patent Number: 4,774,657
[45] Date of Patent: Sep. 27, 1988

[54] INDEX KEY RANGE ESTIMATOR

[75] Inventors: Mark J. Anderson; Richard L. Cole, both of Rochester; William S. Davidson, Oronoco; Wilson D. Lee, Rochester; Peter B. Passe, Rochester; Gary R. Ricard, Rochester; Larry W. Youngren, Rochester, all of Minn.

[73] Assignee: International Business Machines Corporation, Armonk, N.Y.

[21] Appl. No.: 871,637

[22] Filed: Jun. 6, 1986

[51] Int. Cl.⁴ .................. G06F 7/08; G06F 15/347
[52] U.S. Cl. .................................. 364/200; 364/300
[58] Field of Search ... 364/200 MS File, 900 MS File, 364/300, 200, 300 MS File

[56] References Cited

U.S. PATENT DOCUMENTS

| T916,004 | 11/1973 | Conner, II | 364/300 |
|---|---|---|---|
| T947,005 | 6/1976 | Loizides et al. | 364/300 |
| T948,010 | 7/1976 | Woodrum | 364/300 |
| 4,468,728 | 8/1984 | Wang | 364/200 |
| 4,468,736 | 8/1984 | DeSantis et al. | 364/300 |
| 4,497,039 | 1/1985 | Kitakami et al. | 364/300 |
| 4,507,752 | 3/1985 | McKenna et al. | 364/900 |
| 4,571,679 | 2/1986 | Russell et al. | 364/300 |
| 4,575,798 | 3/1986 | Lindstrom et al. | |
| 4,606,002 | 8/1986 | Waisman et al. | 364/300 |
| 4,611,272 | 9/1986 | Lomet | 364/300 |

OTHER PUBLICATIONS

W. Litwin, "Linear Hashing: A New Tool for File and Table Addressing", Pro. 6th Int'l. Conf. on Data Bases, Montreal, 1980, pp. 212-223.

R. Fagin et al., "Extendible Bashing-A Fast Access Method for Dynamic Files", ACM Trans. Data Bases Sys., vol. 4, No. 3, Sep. 1979, pp. 315-343.

Primary Examiner—Gareth D. Shaw
Assistant Examiner—Viet Q. Nguyen
Attorney, Agent, or Firm—Bradley A. Forrest

[57] ABSTRACT

A key estimator estimates the number of keys over a key range defined by key endpoints in an index to a data space. The number of keys in the key range required to be processed for a particular operation is estimated as a function of the number of pages referenced during a range level limited search. Two keys defining range endpoint keys are searched down to their lowest level in the tree. The level limit is then calculated as a function of desired granularity or accuracy of the estimate. The entire range of keys in the desired key range is then searched down to the level limit and the number of pages referenced during the search is counted and multiplied by an average key density per page to calculate the number of keys in the range.

21 Claims, 15 Drawing Sheets

20  DECISION NODE

22  PAGE POINTER

24  TERMINAL TEXT ELEMENT

26  COMMON TEXT ELEMENT 4,774,657

INDEX KEY RANGE ESTIMATOR

BACKGROUND OF THE INVENTION

The invention relates to searching binary tree indexes and in particular to estimating the number of keys in an index key range.

Binary radix trees are based on Knuth: The Art of Computer Programming, Volume 3, "Sorting and Searching", (pp. 471-480) (1973). They have been implemented in the IBM System/38. Their use in the System/38 is described in a book: IBM System/38 Technical Developments pp. 59-63 and 67-70 (1978), and in a System 38 VMC Logic Overviews and Component Descriptions Manual, Sec. 7.1: "Machine Indexes", and Sec. 1.1: "Database" (1978). Binary radix trees are related to B-trees and numerous other trees.

The vast majority of pages (blocks of data paged in and out of main storage) in a binary radix tree index lie at the lowest level of the tree. They are called leaf pages. Searching a range of keys in a binary radix tree index stored in a paging environment is very efficient provided that the pages to be searched are resident in fast access storage. If the pages are not resident, significant time is consumed to retrieve the leaf pages required. Determining the number of keys in a key range has required retrieving large quantities of leaf pages and thus has been time consuming.

Two operations which benefit from finding the quantity of keys within a limited range of key values are Query and Join in a relational data base management program. Knowing the number of keys in a range allows a user to select a more efficient order in which to perform the Query and Join operations.

One attempt at improving the speed of Join operations is indicated in U.S. Pat. No. 4,497,039 to Katakami et al. Katakami et al. describes a Join operation for generating a new table (data space) linking tuples (rows) of a plurality of pertinent tables based on a common field (column) or plurality of common fields. A minimum extraction range for determining the tuples to be processed is determined with respect to the Join field or the plurality of Join fields for each table which is considered as the object of the Join. While processing of unwanted data is avoided, one still touches all the pages in the range of interest to determine the size of the range in a given index. Thus, much time is spent retrieving leaf pages.

SUMMARY OF THE INVENTION

The invention avoids having to retrieve and search all the pages in a key range. An estimate of the number of keys in a binary radix tree index key range to be processed for a particular join or query operation is made as a function of the number of pages referenced, but not retrieved during a range level limited search. Two keys defining the range endpoint keys are searched down to their lowest level in the tree. The level limit is then calculated as a function of desired granularity or accuracy of search. The entire range of keys in the desired key range is then searched down to the level limit. The number of pages referenced, during the search is counted and multiplied by the average key density per page to calculate the number of keys in the range. Since retrieving the lowest most numerous "leaf" level pages has been avoided during the key range search, less than 2% of the pages have likely been retrieved and searched in a four level index. Thus, less than 2% of the time required in obtaining an exact count is used to obtain the estimate.

An operation such as Join (combining data spaces using key field values) is performed much more efficiently if started with a data space containing the smallest number of records and moving up to the data space containing the largest number of records. This technique minimizes the number of searches through successive indexes (which are over the data spaces being joined) to find a match with the previous Join key field value. In one preferred embodiment, each page of the radix tree contains references to up to 60 subsequent pages of the tree. By limiting the search of a key range to a level or depth within the tree above the lowest level, about 2% of the pages in a four level binary radix tree index to a data space are retrieved if the key range search is limited to the third level. So much time is saved by estimating the number of keys in key ranges versus obtaining a precise count of keys in the range, that many candidate indexes or access paths may be pre-examined in contemplation of the optimal order to process a Join operation and still complete the operation faster than performing a brute force Join with the first index encountered.

The estimate of the number of keys in a data space index is also useful in determining the order in which to process Query requests. Before initiating the Query operation, the key range estimating technique is employed in order to select, among alternative indexes, the one which minimizes the amount of processor cycles and disk traffic required to complete the Query. The estimate is useful in selecting the optimal index from a collection of alternative indexes over the same data space(s). If one index is discerned to have far fewer keys in the range of interest than any of the alternative indexes, the choices becomes obvious. If none of the potential access paths reduce the number of candidates sufficiently, the information provided by the estimate reveals that direct processing against records in the underlying data space is the most efficient approach.

DETAILED DESCRIPTION OF THE PREFERRED EMBODIMENTS

Figure 1:
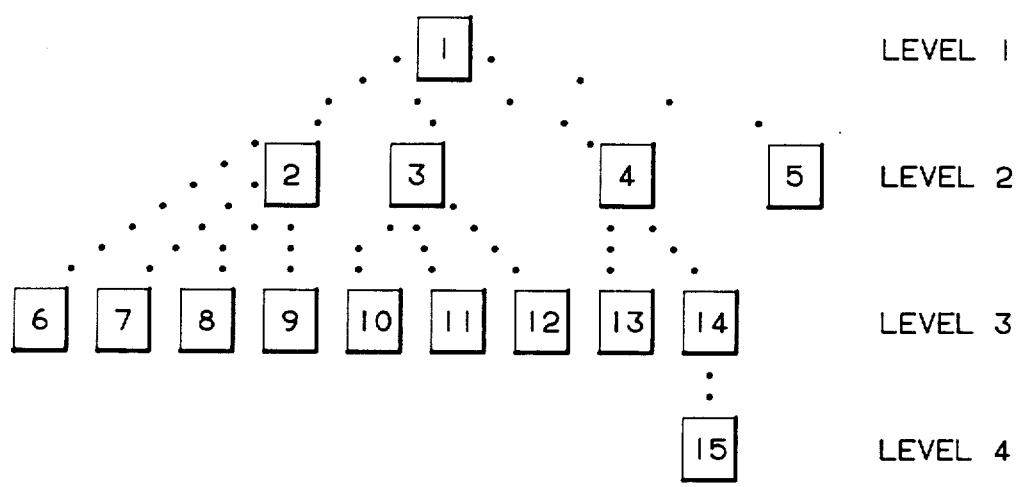
FIG. 1 is a block diagram representation of pages in a binary radix tree index covering a data space.

FIG. 1 is a representation of a binary radix tree data space index which will be used to demonstrate operation of this preferred embodiments of the key estimator. Lines, represented by dots, indicate logical connections between pages in the index, such as page pointers and back pointers. Pages in the index are numbered 1 through 15 with page 1 being located on the first level, pages 2-5 on the second level, pages 6-14 on the third level and page 15 on the fourth level. The single page, page 1 at level one, is referred to as the trunk. Pages which have no logical connections to any higher numbered levels are referred to as leaf pages. Pages 5-13 and 15are leaf pages. The remainder of the pages, pages which connect the trunk with the leaf pages, are referred to as limb pages. Pages 2-4 and 14 are limb pages.

Figure 2:
FIG. 2 is a diagram of the symbols used in the following FIGS. 3-7.
Figure 2:
Figure 2:
Figure 2:

Each page of the index contains some of the following elements, shown in FIG. 2. Decision nodes, represented by the symbol at 20, define the direction (i.e., to the right or to the left) in which a search should proceed. Each decision mode contains forward and backward linkage information. They also contain information defining the type of node, and identify a compare bit which is tested in the desired key to provide search direction (e.g., if the bit is zero, the search proceeds left; if the bit is one, the search proceeds right). Page pointers, represented by the symbol at 22, contain a pointer to the next page in a search path. When a page pointer is encountered, if the page it addresses is not resident in fast access or main storage, the referenced page must be brought (retrieved) from secondary storage such as tape or disk, into main storage. Terminal text elements at 24 contain the remaining part of an entry or key stored in the index. Common text elements, indicated at 26, contain text common to the beginning of more than one entry. The node and page structure is described in further detail in Appendix A.

The particular index represented in FIGS. 1 and 3-7 contain keys relating to a data space comprising a collection of records having information on animals. One key in the data space is the sound that the animal makes, such as BAA or MEOW.

Figure 3:
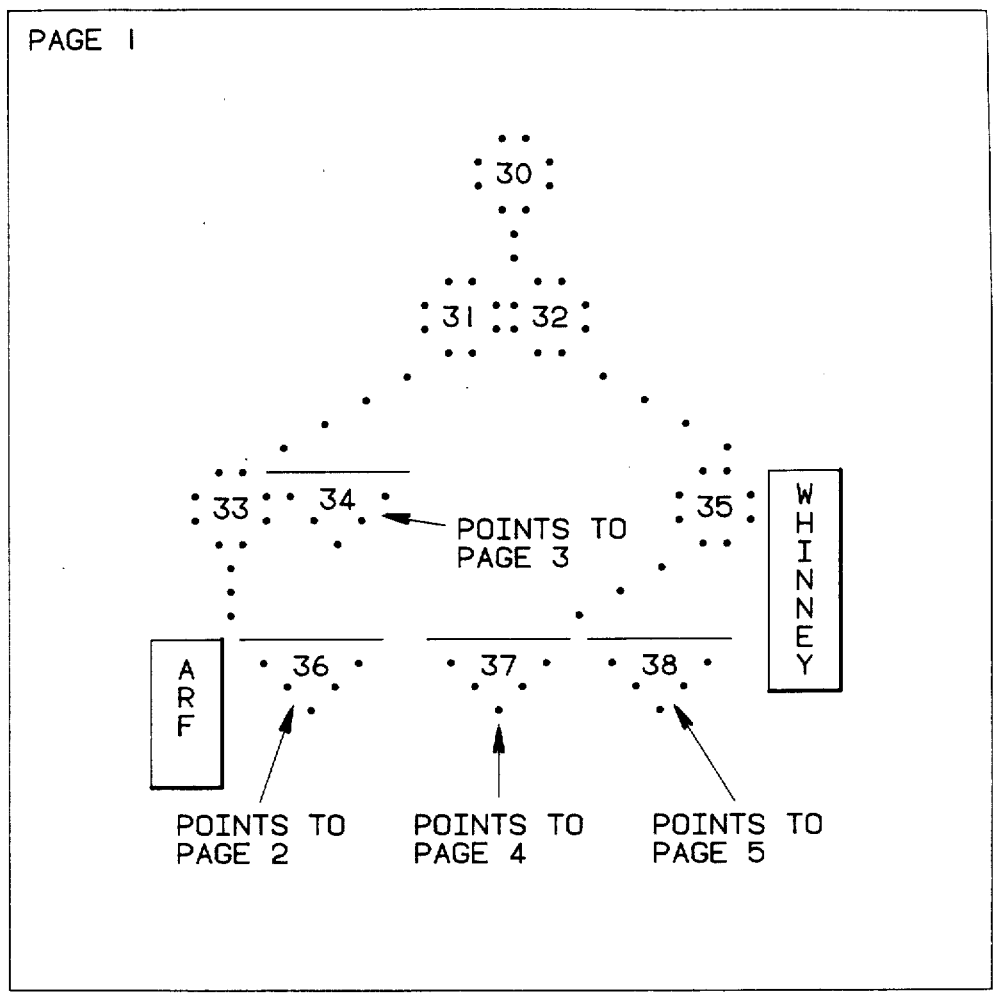
FIGS. 3-7 are detailed block diagram representations of selected pages in the binary radix tree index of FIG. 1.

FIG. 1 shows page 1 of the tree which is represented in more detail in FIG. 3. Two sounds, serving as keys, ARF and WHINNEY are contained on page 1 of the tree, and pointers to other pages of the index are indicated at 34, 36, 37 and 38. Nodes are numbered 30 through 38, the prefix "3" being placed in front of conventional node numbers 0 through 8 corresponding to the figure number. Each key in the index points to a particular address in the data space where a record corresponding to the key exists. If more than one animal makes the same sound, two keys correspond to the sound and point to different records. FIGS. 4, 5, 6, and 7 correspond similarly to pages 2, 3, 8, and 11 of the tree shown in FIG. 1. The pages in FIGS. 3-7 will be examined in connection with an example search below.

The index in FIG. 1 is used to represent a small index for convenience of explanation. An actual index as implemented may contain many more pages and page references. In one preferred embodiment, each page can contain pointers to 60 subsequent pages. This results in a large fanout, n. Consequently, over 120 megabytes will fit in a four level index with 512 byte pages. The fraction of non-leaf pages in a four level binary radix tree is $(n2+n+1)/(n3+n2+n+1)$ where "" is used to indicate exponentiation. For a fanout n=60, the fraction of non-leaf pages is 0.0167. Hence, more than 98% of the pages in a four level binary radix tree will be leaf pages. While a full search of such an index would result in many pages being transferred into main memory, a limited depth search can be performed by transferring less than 2% of the total pages.

Binary radix trees are related to B-Trees and thus the invention described herein is applicable to implementations of binary trees, B-Trees and other n-ary trees. The fanout n=60 is based on an index page size of 512 bytes. Many other page sizes compatible with main storage size and the number of levels desired in indexes may be used. For example, a physical page size of 32,768 bytes permits a fanout n=3840. B-Trees would likely have a lower fanout for similar page sizes unless they employ a front-end compression similar to binary radix trees.

LOGIC FLOW

A key range of interest is specified consisting of two endpoints (keys) which are used to bound the search through an index. The maximum depth of the key range is determined by probing the tree based on the endpoints of the specified key range until a leaf page is encountered. A full search of the tree is done only at the endpoints to determine an approximate maximum depth of the key range. Subsequent sweep operations performed to generate the estimate need not probe the index to the maximum depth.

Unless the tree is badly skewed, this pair of probes provides a reasonable approximation of the average depth throughout the range. If the depths at the two endpoints differ, the deeper of the two probes is used. The right side of the tree in FIG. 1 is not as nicely balanced as the left side. Pages 5 and 15 are leaf pages which lie at different depths than the rest of the leaf pages in the tree. Thus the right side of the tree is considered to be more skewed than the left side. The presence of such skewing can influence the accuracy of the estimate.

The index tree contents are examined from the first endpoint of the range to the second endpoint of the range, inclusive. This search is subject to restrictions imposed by the specified granularity of accuracy (which can be thought of as a "depth cutoff" for the search). The search of the index tree for the specified key range never proceeds deeper than level m of the tree, where m=(granularity of accuracy) * (maximum depth of the specified range), truncated to the nearest integer. A granularity of 0.75 is commonly used, although other granularities may be used depending on the desirability of accuracy versus time. A higher granularity will generally be more accurate, but also require more time to search the key range.

A tally is made of page pointers found in the key range down to level m. If the tree is reasonably balanced, then an estimate of the count of the keys down to the m+1 level is obtained without actually retrieving the pages containing them.

With a range starting on page 8 of the index in FIG. 1 and ending on page 11 as determined by full searches on the keys which are the endpoints of the key range, the maximum depth of the range is three. A granularity of 0.75 limits the level searched to two. Depth cutoff=3 * 0.75=2.25, truncated to 2.

Figure 4:
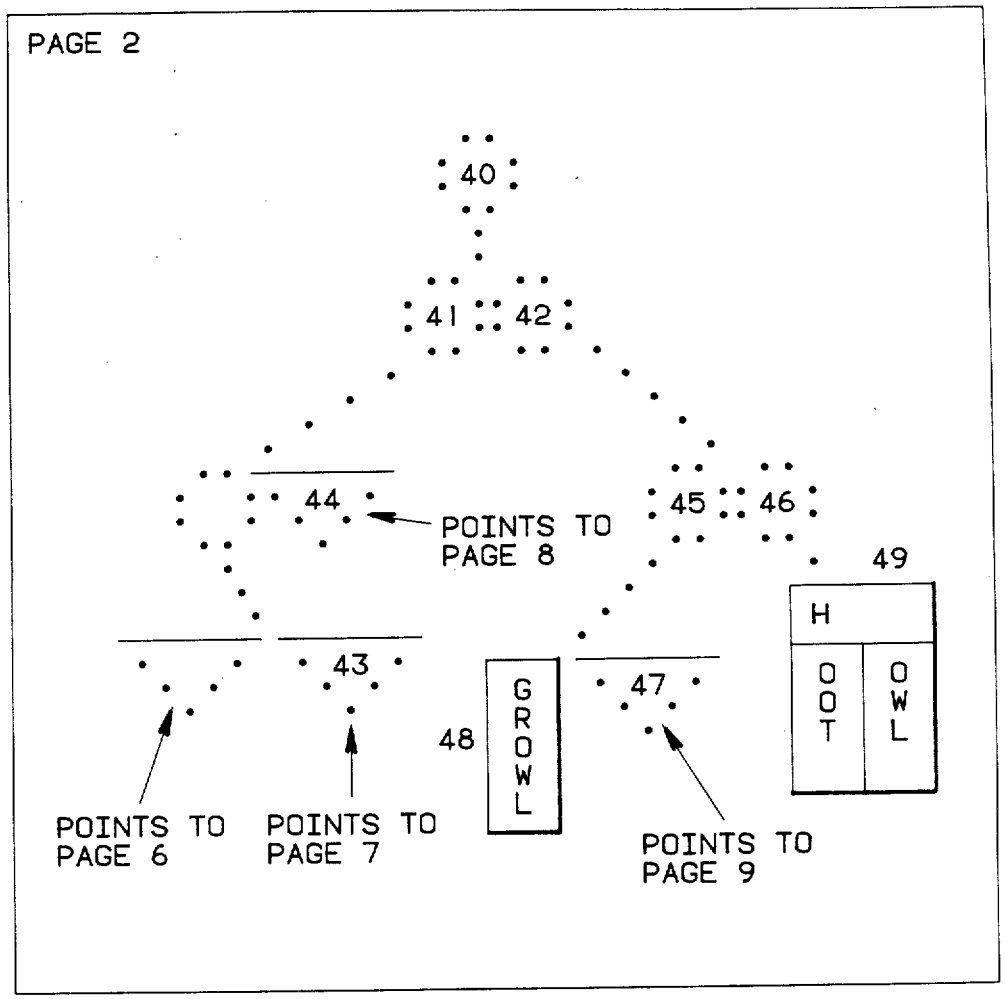
Figure 5:
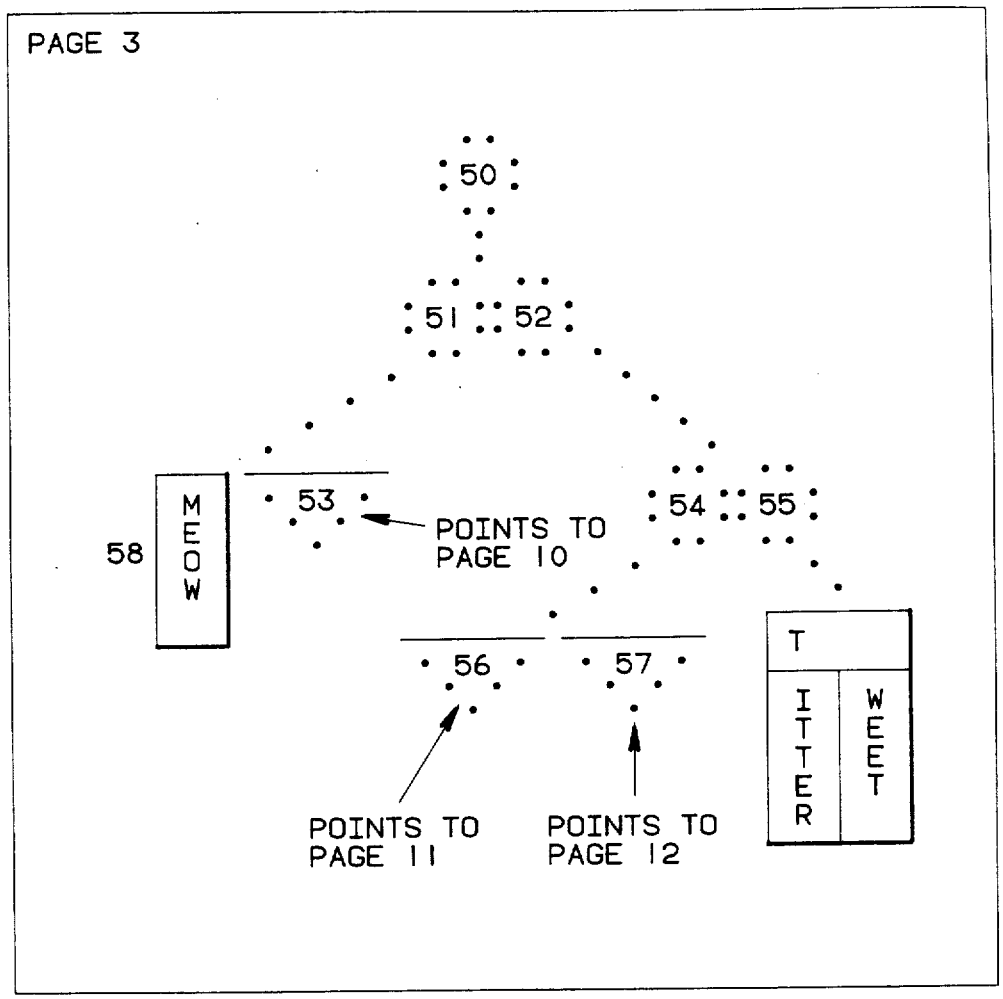

During the sweep of the index to generate the estimate, the index is searched to the page pointer labeled 44 in FIG. 4 on page 2 which points to page 8. The page pointer is tallied, and the index is searched to the page pointer labeled 47 in FIG. 4 to page 9 which is also tallied. Similarly, the pointers to pages 10 and 11 (53 and 56) are found and tallied. This ends the search of the range and the tally of page pointers is four.

While only pages 1, 2, and 3 were "touched", the entries on pages 8, 9, 10, and 11 were accounted for. Thus, four potential page faults were avoided. While we retouched page 1 when navigating to page 3, it likely did not cause a page fault since we already referenced it in navigating to page 8. Page 1 is called the trunk of the index and is highly referenced, so that in a virtual paging environment using a least recently used page replacement scheme, the trunk page is likely to remain resident in main memory. It is touched anew for all searches through the index.

Multiplying the number of page pointers found, by the key density (which is the average number of keys per page) provides an estimate of the number of keys in the entire key range. The number of keys as well as the total number of pages within the tree is maintained in an index header which is generated at creation of the index. The header is updated when new entries are added to the data space. The number of page pointers includes trunk, limb, and leaf pages. It does not include allocated but empty pages. A fairly uniform distribution of keys and a tree which is well balanced improves the accuracy of the estimate produced. Several maintenance techniques are available to obtain balanced trees.

In a different embodiment, the overall maximum depth of the index is maintained in the header of the index so that the depth of search limit is quickly and more accurately obtained. The depth of search is limited to one less than the maximum depth of the index. This provides a more accurate depth of search limit when the endpoint keys are located closer to the root than the other keys in the range. It ensures that the depth is great enough to obtain a more accurate key estimate. Pages below the limit are not retrieved, as they might be when performing the full search on the endpoint keys. Limiting the search to one less than the maximum depth is also feasible when using endpoint key probes. The maximum depth for the key probe is used as the maximum depth of the tree. This works well for most key ranges because the leaf pages are not retrieved. In general, the search level limit m will be the level before the maximal fanout of the index. Searching up to and including this level provides sufficient data to generate an accurate approximation without incurring excessive paging.

To reduce total elapsed time required to obtain the estimate, an asynchronous read operation is initiated against an adjacent page before proceeding to search the current mth level page. Depending on the actual page size employed, and the amount of time required to search the current mth level page, some central processing unit and I/O overlap is achieved thereby reducing total elapsed time. Further detail of asynchronous reading follows the example below.

EXAMPLE

Figure 8:
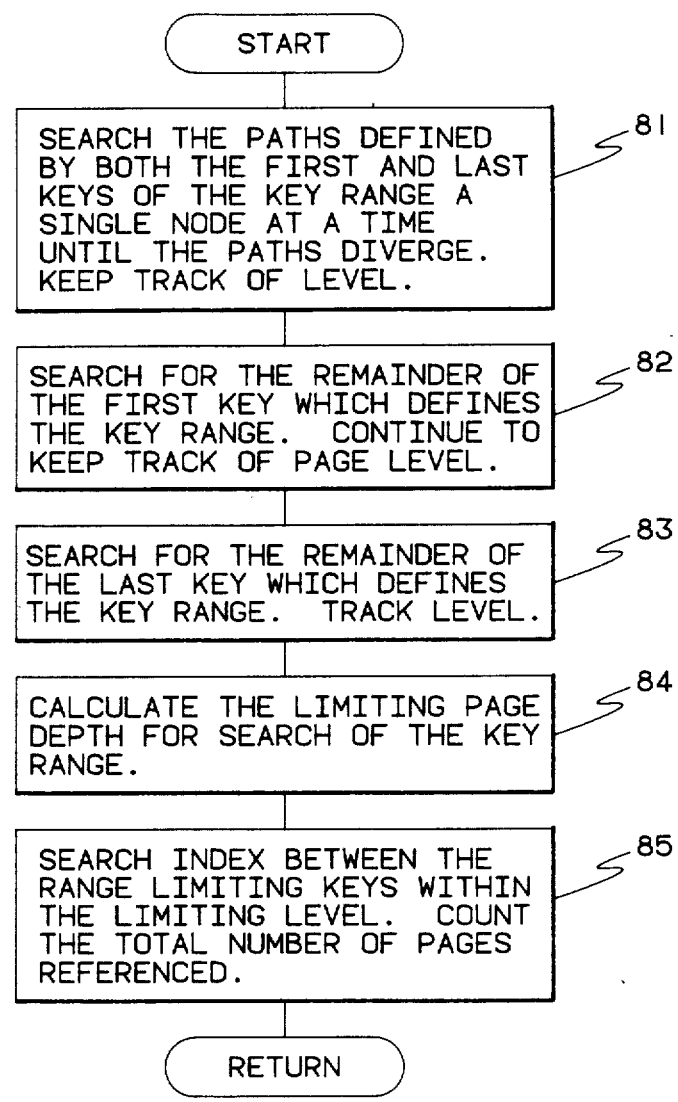
FIG. 8 is a general block flow diagram of the functions performed during estimation of a key range in an index.

Steps required to produce a number of keys estimate for the key range of "BAA" to "QUACK" for the animal sound index to an animal characteristic data space (not shown) is described in the following paragraphs. "BAA" is referred to as a left endpoint key. "QUACK" is a right endpoint key. FIGS. 3 through 7 show the binary radix tree pages touched during the estimate. Tree pages 4–7, 9, 10 and 12–15 are not shown in detail since they are not searched during the estimate process. FIG. 8 is a flowchart of general steps followed in the example.

Block 81 is a search means whereby the location in the binary tree where the endpoint key paths first diverge to produce a range is identified. A cluster is defined as any two elements, such as two nodes, or a node and a page pointer, or terminal text and a node to name a few possibilities. The node cluster where this divergence takes place is known as the cluster of divergence or point of divergence. Blocks 82 and 83 are search means for the endpoint keys which begin at the cluster of divergence. When combined, blocks 81, 82 and 83 generate the page depth for each endpoint key and the maximum of these values is determined in block 84 to serve as the search limiting means.

Block 85 is a range search means to search the index between the endpoint keys and within the maximum level. It also serves as a key estimator means for counting the number of pages referenced and pointed to during the range search up to the page level limit.

Figure 9:
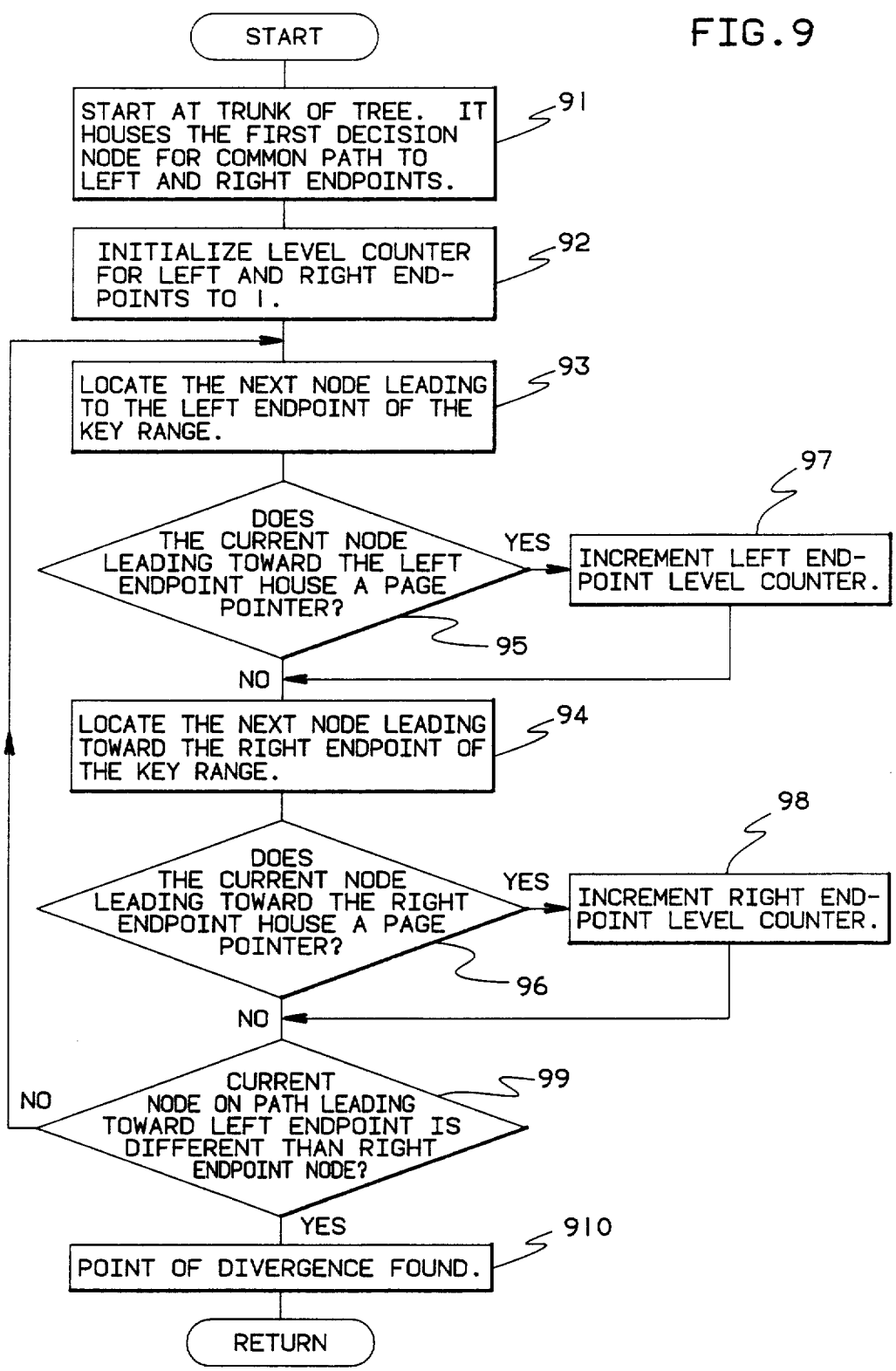
FIG. 9 is a simplified block flow diagram of searching two endpoint keys defining the key range to find a path divergence point.

A parallel search of both "BAA" and "QUACK" is performed, navigating a single node at a time until the cluster of divergence is located. This cluster is that one containing nodes 33 and 34 on page 1 of the index in FIG. 3. "BAA" will be positioned on node 33 and "QUACK" on node 34. A separate current level counter is maintained for both the "BAA" and "QUACK" keys. Since both of these searches start (block 91 in FIG. 9) on the trunk page (page 1), these counters are both initialized to one, as indicated in block 92 of the detailed flowchart of FIG. 9. Every time the search (blocks 93 and 94) proceeds forward from a parent page on one level to another page on a lower level of the index as indicated in blocks 95 and 96, the counters are incremented at blocks 97 and 98. In the case of "BAA" no page pointers are encountered so the count remains at 1, but "QUACK" encounters a page pointer at node 34 so its level counter becomes 2. The difference in nodes is noted in block 99, indicating that the point of divergence has been found in block 910. The search illustrated in FIG. 9 identifies the lowest cluster serving as a point of divergence between the left endpoint and right endpoint and records the depth of this cluster. In the example, this is the cluster shown in FIG. 3 residing on Page 1 of the tree housing the pair of nodes labeled 33 and 34. The cluster is the cluster of divergence. It will serve as a starting point for the adjacent range search described below.

Figure 10:
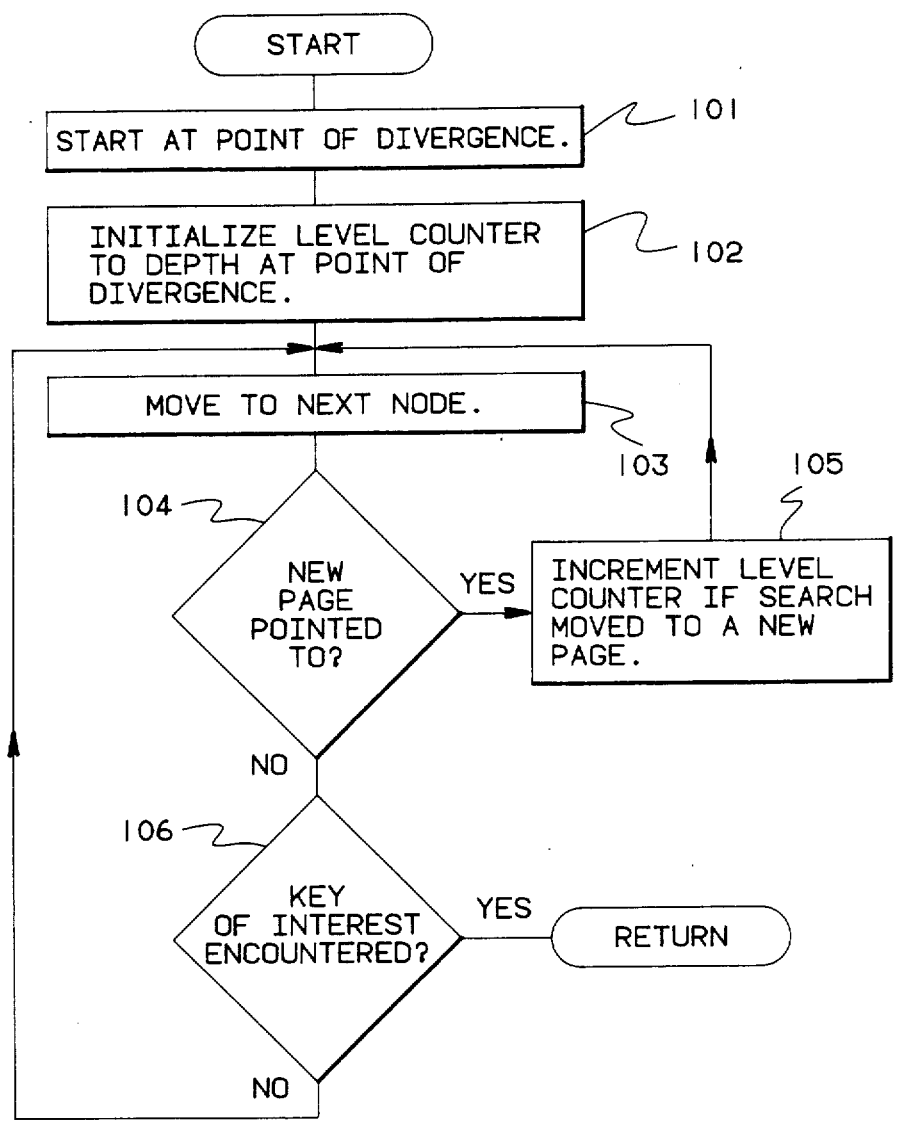
FIG. 10 is a detailed flow diagram of searching the endpoint keys from the divergence point.

Starting from the point of divergence, a search having the flow indicated in FIG. 10 is performed for each endpoint at block 101. The level counter is initialized for the left endpoint at block 102. It is equal to the depth at the point of divergence. The next node in the path is moved to at block 103. If the next node is a page pointer at block 104, the level count is incremented at block 105 and the next node is moved to at block 103. If not, but it is the desired endpoint key as indicated at block 106 the level count is complete for that key, and the right endpoint's level count is found in the same manner. If the desired endpoint key is not encountered at block 106, the next node is moved to at block 103.

Figure 6:
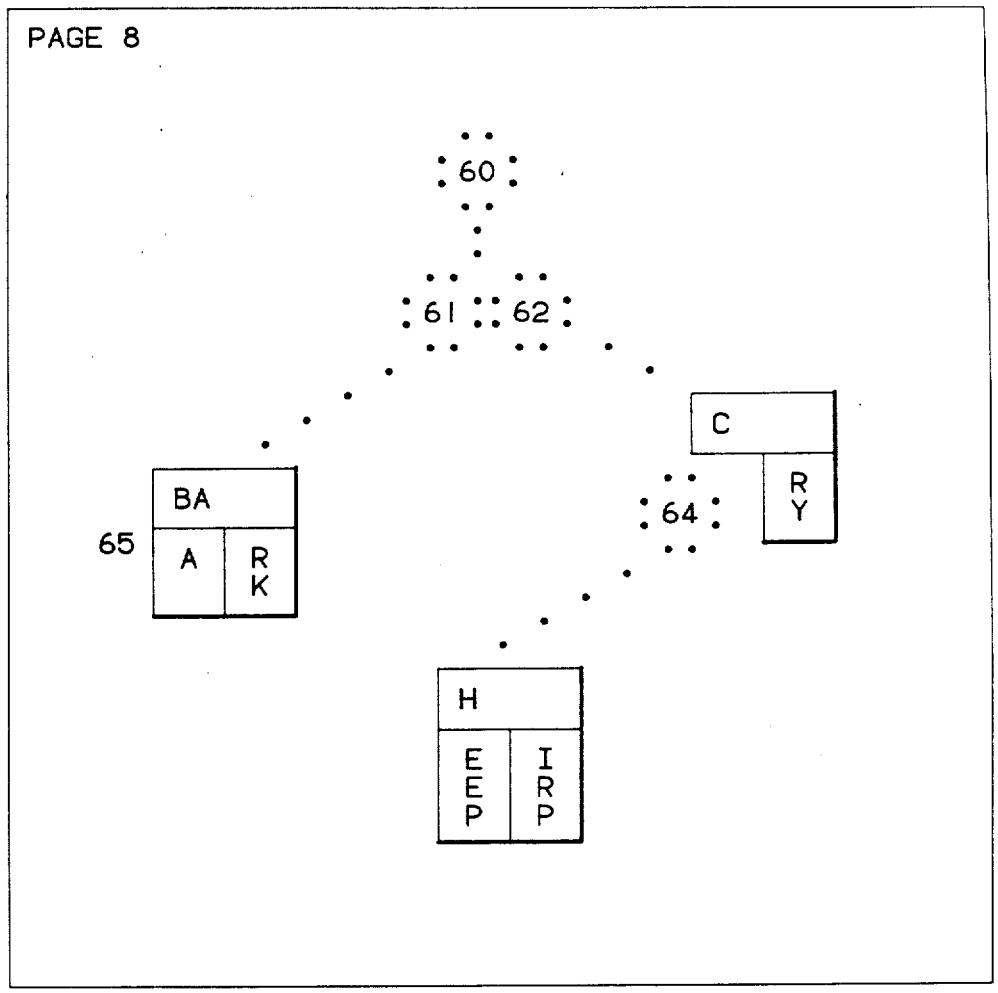
Figure 7:
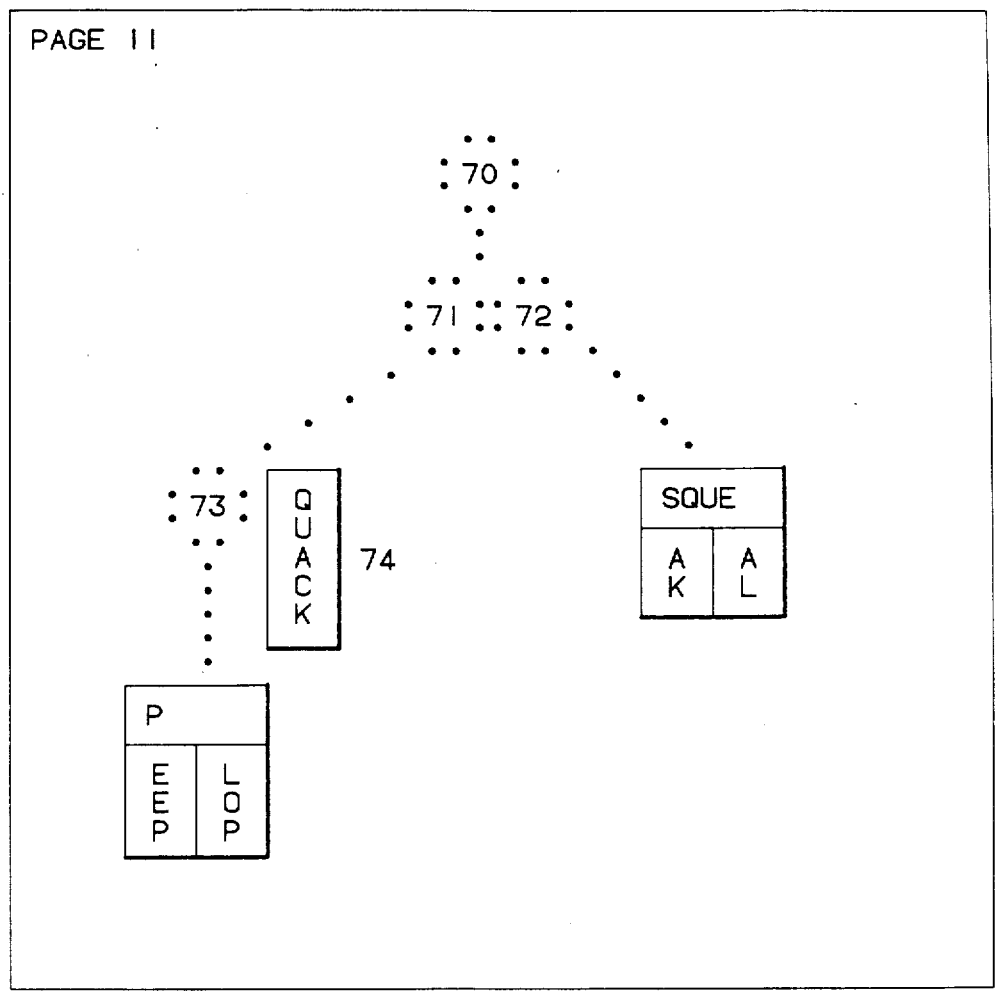

Once the point of divergence is found the search for "BAA" continues at block 101 with the left node (node 33) of the cluster of divergence and proceeding to the text for "BAA" at cluster 65 of page 8 in FIG. 6. The level counter which began at the parallel search described above continues to be incremented each time a new page on a deeper level of the tree is encountered as "BAA" is searched. The search for "BAA" encounters two more page pointers (labeled 36 and 44) so the maximum depth is three when the search is complete.

A similar search is performed for "QUACK" which encounters only one more page beyond the point of divergence and thus also has a maximum depth of 3.

Figure 11:
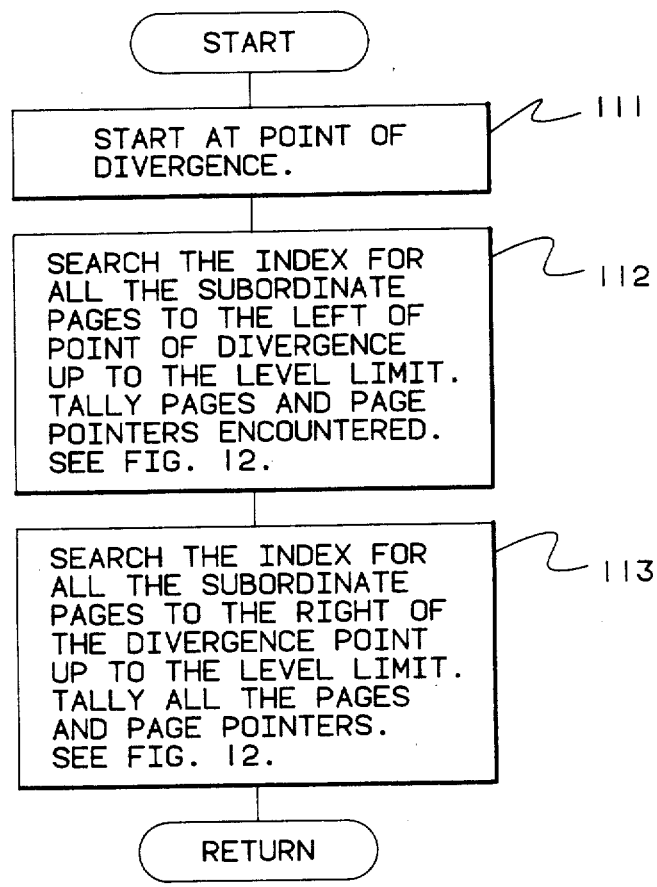
FIG. 11 is a general block flow diagram of searching a range between keys within a level limit of the index of FIG. 1.

Having determined a level limit of 2, (3 *0.75), the key range is searched starting at the point of divergence in block 111 in FIG. 11, to determine the count of page pointers within the range. The nodes subordinate to node 33, the left node in the cluster of divergence, are searched at block 112 to the limiting level toward the right. Once the search backs into (i.e., returns to) node 33, there are no more pages in the left half of the range. Then the nodes subordinate to node 34, the right node in the cluster of divergence are searched at block 113 toward the left to the limiting level. Once node 34 is backed into, the entire range has been searched and the number of keys in the range are estimated. The above search of the key range is referred to as a symmetric sweep, right and left. First the nodes subordinate to node 33 are swept right, then the nodes subordinate to node 34 are swept left. Coding is simplified in that a check need only be made to see if the search is at the cluster of divergence to determine if all the subordinate nodes have been searched.

A further preferred embodiment of the invention performs the pair of symmetric sweep operations in parallel. Two separate tasks perform the symmetric sweep. A first task performs the sweep of the left half of the range, and a second task performs the sweep of the right half of the range. Total elapsed time required to generate the estimate is reduced by performing the sweeps in parallel.

With a desired accuracy of 75%, the depth cutoff is level 2. Hence, searching of the key range did not proceed beyond level two. Consequently, leaf pages 9 and 10 which reside at a depth of three, were not retrieved or searched even though they house keys of interest.

Figure 12A:
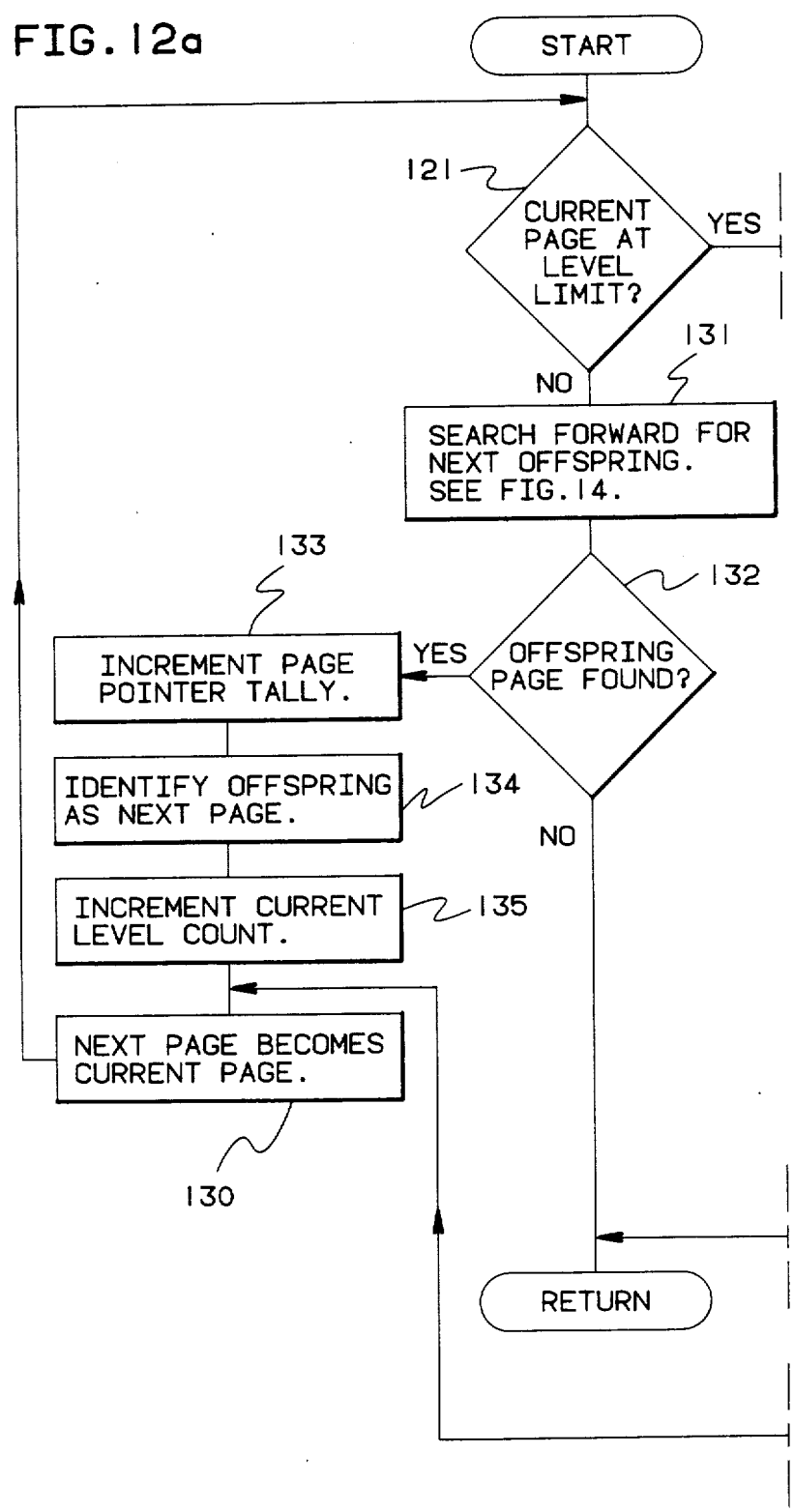
FIGS. 12a-b is a detailed block flow diagram of searching pages in the key range to tally page pointers and pre-fetching pages for enhanced performance during the search.
Figure 12B:
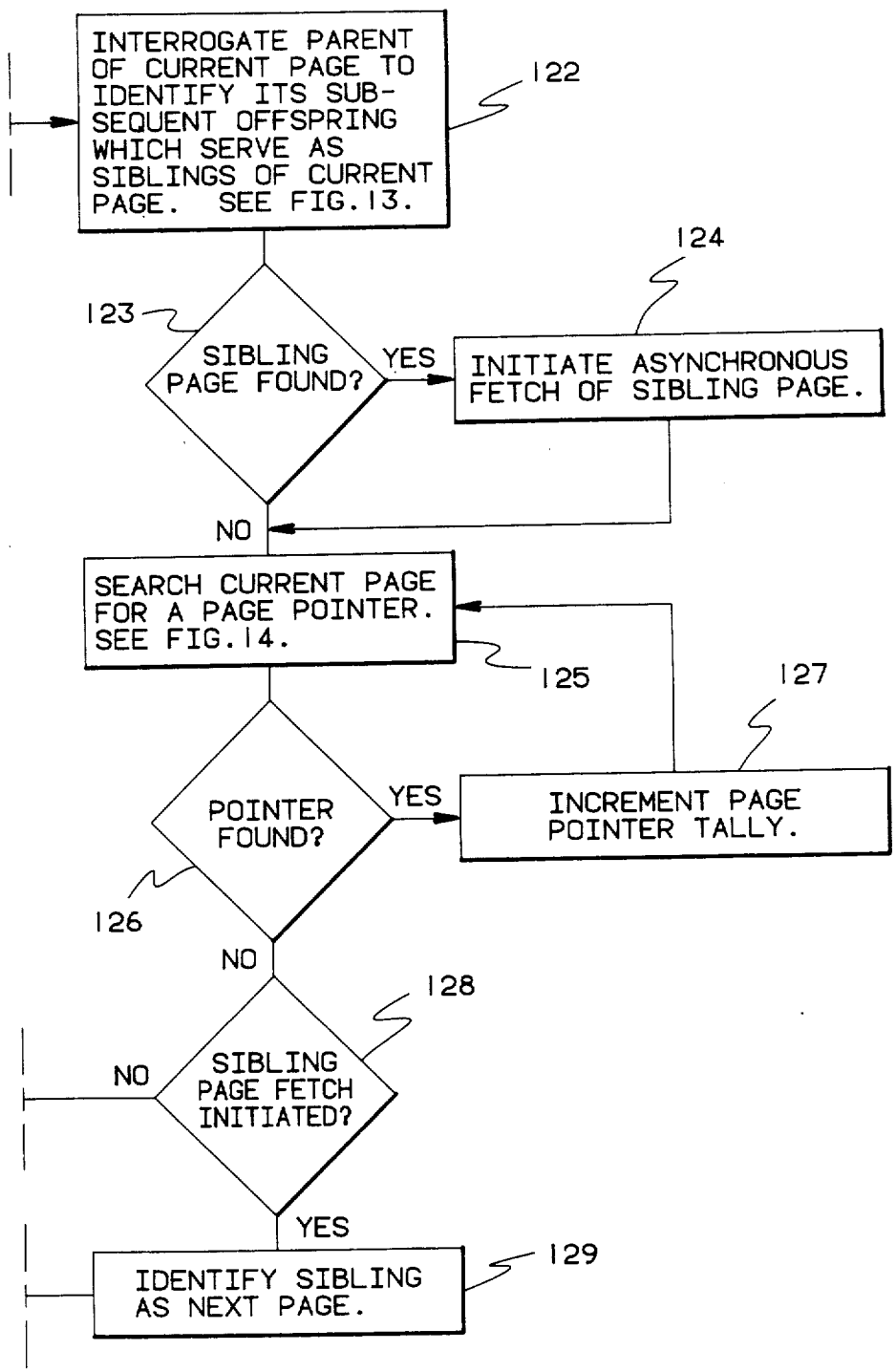
Figure 13:
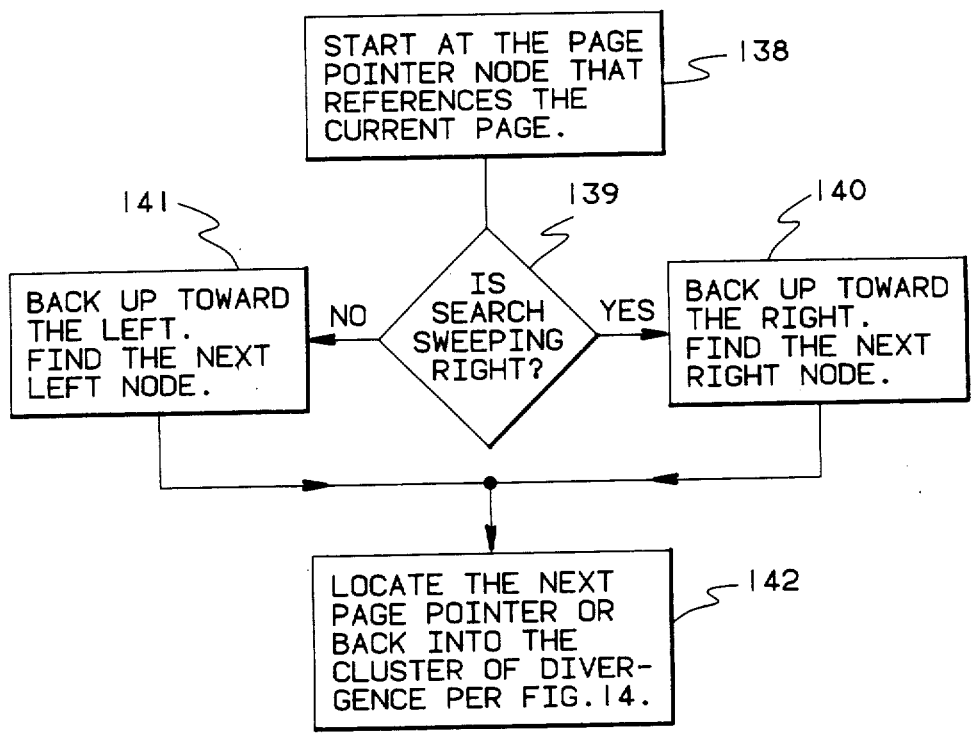
FIG. 13 is a detailed block flow diagram of locating subsequent sibling pages of a current page.
Figure 14:
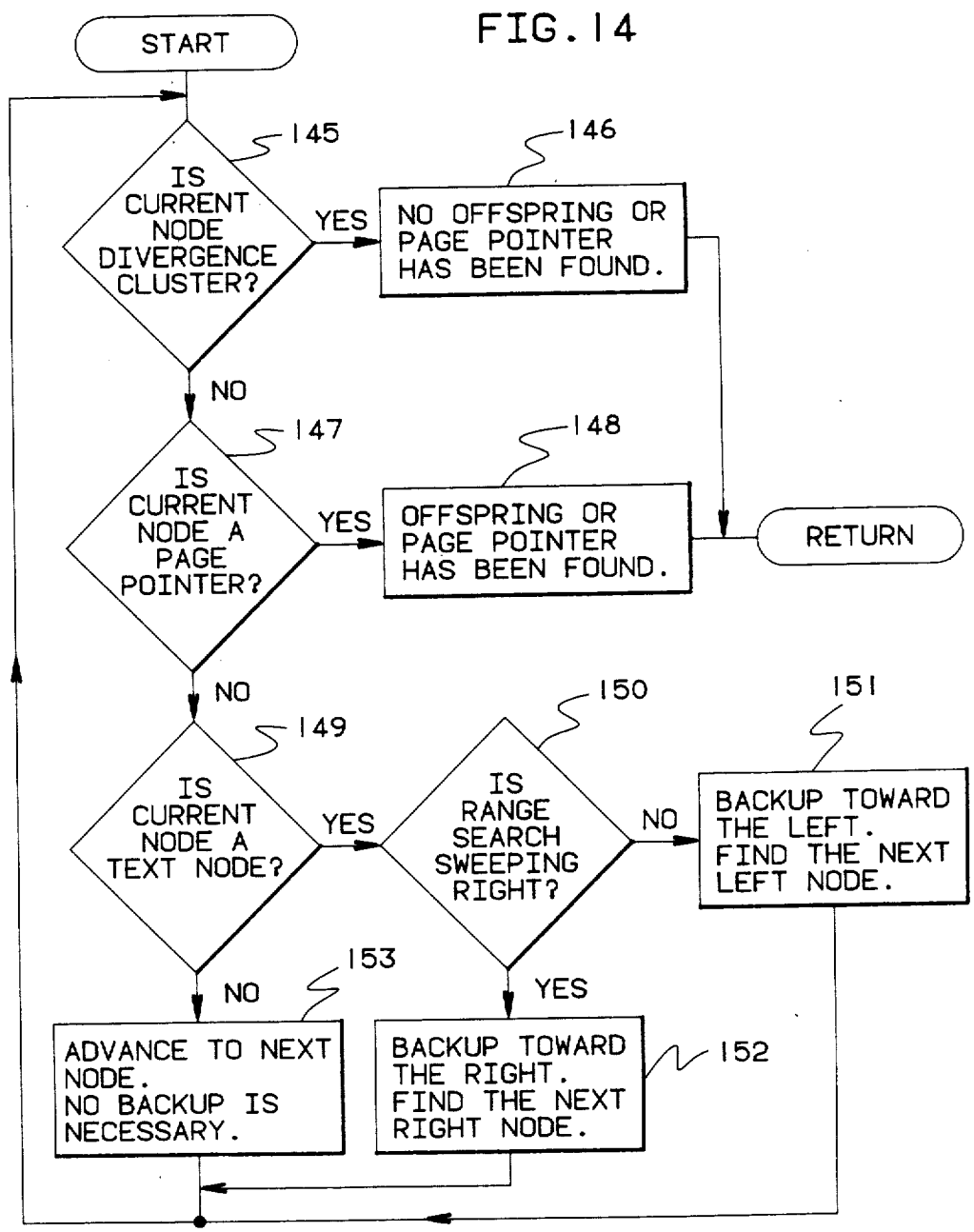
FIG. 14 is a detailed block flow diagram of searching a page for page pointers or offspring pages of the current page.

The key range search is now described in further detail. The actual path of the search is first discussed, then, the flow as represented in FIGS. 12, 13 and 14 is discussed in conjunction with pre-fetching of pages.

In the search of the above specified key range, a continuation of the search for "BAA" is performed from the point of divergence, node 33, until the depth cutoff of two is reached. This leads to page 2, FIG. 4 at the page pointer labeled 44. In the preferred embodiment, this position is remembered from the initial key limit search and the range search starts directly at page pointer 44. Rather than continue the search onto page 8 at a level of 3, an adjacent find from this point is performed thereby locating the next key path in the index. The page pointer tally is incremented to one to account for the page pointer labeled 44. Note that the search will not proceed to the page pointed to (page 8) because it has reached the depth cutoff of 2.

The search backs up from page pointer 44 on page 2 to the node labeled 41 on page 2. It moves to the right one node to the element labeled 42, and searches for the next key path. Node 45 is reached, and then the search continues to the terminal text corresponding to "GROWL" indicated at 48. Every time a terminal text element is encountered, the search proceeds forward. Since the terminal text 48 is a left element, the search moves to the right element of the cluster which is the page pointer labeled 47, the page pointer tally is incremented to two, and the search is backed up.

The backup takes the search to node 45, the parent node of the cluster just processed, which is a left node. Going forward to node 46 and then forward again takes the search to the terminal text corresponding to "HOOT" and "HOWL" indicated at 49. This causes a backup to node 46, which is a right node. Further backups to node 42, a right node, and to node 40, the root node of page 2 are done.

Having completely processed the nodes of interest on page 2, a backup from page 2 using backpointer information stored in a page header causes the current level count to be decremented to one and locates the search at node 33 on page 1, FIG. 3. Since node 33 is the left node of the cluster of divergence, the search moves forward to the page pointer labeled 34. This is a point shallower than the depth cutoff, so the search proceeds forward, this time on the path of the right endpoint and sweeping left. The search proceeds onto page 3, FIG. 5. The current level counter is incremented to two. The search proceeds down to nodes 52, 54, and then to the page pointer labeled 56. The page pointer count is incremented to three. The search backs up to cluster 51 and 52, then down to page pointer 53. The page pointer count is incremented to four. The search proceeds left to text 58 "MEOW", and back up through nodes 51 and 50 to the cluster of divergence, nodes 33 and 34. Searching of the key range is finished.

The search has not proceeded below the depth cutoff, so page faults on many pages have been avoided. If there are 100 entries identified by keys in the index searched as indicated in the index header, produced when the index was created, then the approximate number of entries in the range is:

| entries per page | = | number of entries/number of pages in the entire tree |
|---|---|---|
| | = | 100/15 |
| | = | approximately 6 |
| number of entries | = | number of page pointers * entries per page |
| | = | 4 * 6 |
| | = | 24. |

If pages 9 and 10 (not shown) have 5 entries apiece as do pages 8 and 11, then the exact count of entries in the range is 22. Thus, a fast and accurate estimate has been obtained, while touching few pages of the index.

A further preferred embodiment of the invention compensates for the fact that some keys do not lie on the leaf pages. This can occur as seen in the terminal text corresponding to the text element "GROWL", FIG. 4. The solution involves counting the number of terminal text elements encountered while searching for page pointers. The count is added to the estimate which is based on the number of page pointers residing at the level limit times the average number of entries per leaf page. For a four level tree, the number of entries per leaf page is determined by the total number of entries in the index divided by 2% less than the total number of pages in the index.

ASYNCHRONOUS PRE-FETCHING OF PAGES

One time saving feature of the present invention involves asynchronous pre-fetching of sibling pages at the level limit. In this description, "offspring" is defined as any page above or at limiting level as the search proceeds through the pages subordinate to the nodes in the cluster of divergence. "Sibling" is defined as the next page that will be needed after processing the current page which is at the limiting level. Thus "siblings" can be pages at the limiting level or pages which are truly "offspring" pages as defined above.

A flowchart in FIG. 12 is used to describe asynchronous pre-fetching of sibling pages at the level limit. During the search of the range, when the current page is at the level limit as indicated at block 121, the parent page (i.e., the page containing the page pointer that references the current page) of the current page is interrogated at block 122 to identify subsequent sibling pages of the current page. Subsequent sibling pages are identified following the flow in FIG. 13. At block 138, the search for subsequent sibling pages starts from the page pointer node that references the current page. A decision block 139 directs the search in the correct direction depending on whether the range search is sweeping right, or left. If right, block 140 directs the search back up toward the right and finds the next right node. If left, block 141 directs the search back up toward the left, and finds the next left node. Blocks 140 and 141 flow into block 142 which locates the next page pointer, or backs into the cluster of divergence.

If a sibling page is found at block 123 in FIG. 12, an asynchronous fetch of the sibling page is initiated at block 124 so that it may be in main storage by the time it must be searched. The current page is then searched for page pointers in the loop of blocks 125, 126 and 127. When page pointers are encountered at block 126, a page pointer tally is incremented at block 127. Block 125 is represented in further detail in FIG. 14. First, a decision block 145 determines if the current node is in the cluster of divergence. If yes, no offspring or page pointer has been found, as indicated at block 146, and flow is returned. If no, decision block 147 determines if the current node is a page pointer. If yes, an offspring, or a page pointer has been found, as indicated at block 148 and flow is returned. If the current node is not a page pointer, a decision block 149 determines if the current node is a text node. If it is, a decision block 150 directs the search to block 151 or 152 for backing up and finding the next node dependent upon whether the range search is sweeping left or right respectively. If the decision at block 149 was no, the next node is advanced to at block 153 with no back up necessary. Flow from blocks 151, 152 and 153 continues onto block 145 until a yes decision is reached in either blocks 145 or 147.

When all the page pointers on the current page have been tallied, block 128 in FIG. 12 provides divergent paths for the range search. If the divergence cluster was found, no sibling page fetch will have been initiated and hence, flow is returned to FIG. 11 at blocks 112 or 113. If a fetch has been initiated, the sibling being fetched is identified as the next page in block 129, and block 130 then identifies the next page as the current page, thereby effectively designating the pre-fetched sibling as the proper place to continue the range search.

The current page, which was the sibling for which a fetch was initiated at block 124, is likely to have arrived in main store by this time. Time is thus saved by initiating the fetch which is referred to as an I/O operation, and then processing the then current page for page pointers in the 125, 126, 127 loop while the I/O operation is proceeding.

Block 121 then determines if the current page is at the limiting level. To follow the alternate path from this block, the current page is not at the limiting level. The current page is then searched for offspring at block 131. If the divergence cluster is encountered, flow is returned. If no offspring are found at block 132, the search returns to the main range search flow in FIG. 11 at blocks 112 or 113. If an offspring is found, the page pointer tally is incremented at block 133, the offspring is identified as the next page at block 134, and the level count is incremented at 135.

An alternative pre-bringing technique involves navigating ahead more than one page. n pages have brings initiated prior to processing one of the next pages, where n is calculated to determine the most advantageous processor and I/O overlap. n is also a function of the paging mechanism in that the length of time a page is retained is a limiting factor in the number of pages which may be pre-brought.

APPLICATIONS

By estimating the number of records in a specified key range the user (a person or a program for example) may make a better performance choice in both ad hoc queries and query applications against real time data. The estimate is useful to determine whether it is more efficient to perform direct processing of the data space as opposed to creating a new, more selective index which references only the data space records of interest. If the number of records estimated in the key range is large, then it is generally more efficient to process the data space directly rather than creating a new index of candidate entries.

When several query selection criteria are specified and more than one of the selection criteria has an index that could be used, the estimates are used by the user to decide which one of the candidate indexes to use to create a more selective index. The goal is to choose the selection criteria and hence the index which will produce the least number of records to process further. This minimizes the number of pages which must be touched both in the index and the data space(s).

An example of a query with selection criteria is: "All employees with: Age less than 30 AND Salary greater than $30,000." If two indexes exist, where age is the primary key field in one and salary is the primary key field in the other, then an estimate is obtained for each range. Age between 0 or the left most path in the age index and 30 is one range, and salary between 30,000 and the right most path of the salary index is the other range. In general, the index with the smaller estimate of keys in the specific range is chosen by the user. Other factors are considered by the user such as total number of pages in the index, since the index with the smaller estimate could have three times the pages and thus be more expensive to process.

For Join operations, the invention helps determine the order in which the Join of the data spaces should occur. In general, each data space participating in the Join has an index over it where the Joining field serves as a key field in the index. A composite joined image is subjected to selection criteria intended to reduce the number of qualifying records. Where the criteria apply to key fields, this invention is employed to extract an estimate of the number of records satisfying the selection criteria. These estimates are then used to help order the Join of the data spaces. A discussion of the importance of the order of the Join follows:

A common field, called the Joining field, is defined in each pair of data spaces involved in the Join. Since it is generally more efficient to Join data spaces by employing indexes over them, the index corresponding to each data space participating in the Join must have an analogous common key field in the index over it, called the Joining key field.

It is most advantageous to start with the data space that has the fewest candidates. The data spaces are processed in increasing order, to the data space with the largest number of candidates. This minimizes the number of searches through successive indexes to find a match with the previous Join key field value. This in turn results in both the smallest amount of paging against the data space, and the least processing time necessary to Join the data spaces due to the minimizing of the number of searches produced by the Join fanout.

For example, when Joining three data spaces which have indexes over them with the appropriate Joining key fields, assume index one has n candidates, index two has m candidates, and index three has p candidates. Also, assume n is less than m is less than p.

If the data spaces are joined in increasing order, and a full fanout is encountered, all candidates in successive indexes are inspected. n searches on index one, plus 1 search to tell that there are no more candidates in index one (a miss) are performed. For each candidate in index one, m searches in index two are performed, plus n misses or nm +n. For each candidate in index one and for each candidate in index two, p searches are performed in index three plus nm misses. Thus, nmp+nm searches are performed on index three.

The total number of index searches over all three indexes is: (n+nm+nmp)+(1+n+nm), where the first term is the number of hits and the second term is the number of misses.

If the Join is performed in decreasing order, the number of searches is much higher: (p+pm+pmn)+(1+p+pm). If n=2, m=5, and p=10, the number of searches for an increasing order Join are 125 versus the number of searches for a decreasing order Join of 221. Due to the fanout of the number of candidates in the Join of multiple data spaces, it is advantageous to do the Join in increasing candidate order. Estimating the size of key ranges of indexes with keys subjected to selection criteria enables selection of the most advantageous order in which to Join data spaces.

While the invention has been described with respect to particular embodiments, it will be apparent to those skilled in the art that further embodiments are within the scope of the following claims. The invention provides performance benefits on binary trees, binary radix trees, B trees and other types of indexes. Numerous ways in which to limit the depth of the search and control pre-fetching of pages are also within the scope of the invention.

APPENDIX A—Node and Page Structure

All Index elements (nodes, page pointers, text elements) are three bytes in size. (Number of bits in field represented by number in box).

The node format is as follows:

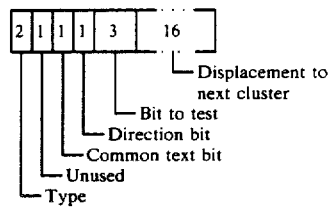

Type: 10=Node
Common text bit: Successor cluster contains common text. (0=Common text present).
Direction bit: Indicates relative location of this node within the cluster. (0=Left, 1=Right).
Bit to test: Indicates which bit in the current argument byte should be tested to determine the direction of the search through the tree (0 to 7).
Displacement to next cluster: Exclusive OR displacement to next cluster.

The page pointer format is as follows:

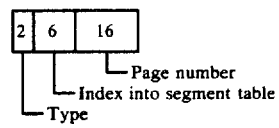

Type: 11=Page pointer
Index into segment table: Identifies a segment of storage containing a desired page.
Page offset: Identifies the page number of the new page in the containing segment.

The text element format is as follows:

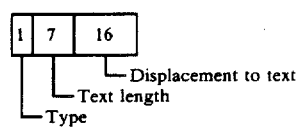

Type 0=Text Element
Text length: Length of text element (0 to 127)
Displacement to text: Page offset to actual text
Logical page format Index logical pages may range in size from 512 to 32768 bytes.

A page in use has the following format (field width expressed in number of bytes):

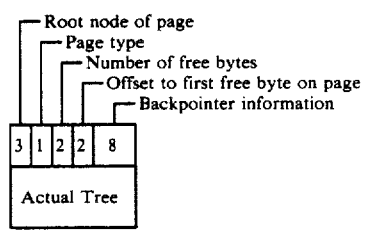

A free page has the following format:

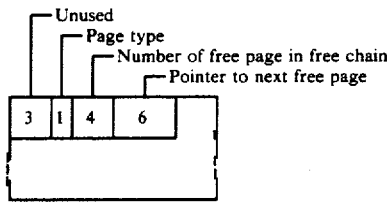

We claim:

1. A key estimator for estimating the number of keys over a key range defined by key endpoints in a tree-like index having a plurality of pages, comprising:
   search means for searching the index for each of the key defining the key range and keeping track of the level of search required for each range endpoint key;
   limiting means for providing a level limit as a function of the levels of search for each range endpoint key and a desired granularity of search;
   range search means for searching the index between the range endpoint keys down to the level limit determined by the limiting means; and
   key estimator means for counting the number of pages pointed to during such range search.

2. The key estimator of claim 1 wherein the limiting means provides the level limit as a function of the deeper level of the levels of search performed by the search mean for the range endpoint keys.

3. The key estimator of claim 1 wherein the tree-like index comprises a binary radix index having the capability of more than two page pointers per page of the index.

4. The key estimator of claim 3 wherein each page of the index contains up to 60 page pointers per page of the index.

5. The key estimator of claim 1 wherein the level limit is at least one level above the lowest level of the index.

6. The key estimator of claim 1 wherein the index comprises a header section which contains the number of keys and pages in the index and wherein the key estimator means multiplies the number of pages counted by the number of keys divided by the number of pages in the index to obtain an estimate of the number of keys in the key range.

7. The key estimator of claim 6 wherein the number of keys estimate is used to select an order of operation for certain functions.

8. The key estimator of claim 7 wherein the numbers of keys estimate is used to select the order of operations to be performed in a Join operation.

9. The key estimator of claim 8 wherein multiple collections of records are to be Joined, and an estimate of the number of keys contained in desired key ranges in indexes to each collection of records is performed.

10. The key estimator of claim 9 wherein the order in which collections of records are Joined is a function of the estimates of the number of keys in the desired key ranges in each index.

11. The key estimator of claim 10 wherein the collections of records are Joined in order of ascending numbers of keys, with the collection of records having the least number of keys having the Join operation performed first, and the collection of records having the greatest number of keys having the Join operation performed last.

12. The key estimator of claim 6 wherein the number of keys estimate is used to select an optimum index to employ in performing a query operation.

13. The key estimator of claim 1 and further comprising:
   look ahead means for determining future pages required by the range search means to search an index; and
   pre-bring means for pre-fetching the future pages such that they may be available for searching when required by the range search means such that minimal delay is encountered in searching the index.

14. The key estimator of claim 13 wherein the range search means continues searching of pages preceding the future pages while such future pages are being pre-fetched.

15. The key estimator of claim 13 wherein the look ahead means checks for further pages to pre-fetch prior to searching pre-fetched future pages.

16. A method of estimating the number of keys in a key range over an index wherein the index is stored in page form, said pages having page pointers to other pages in the index, the method, comprising the steps of:
   (a) defining a left endpoint and a right endpoint in the key range;
   (b) searching each endpoint of the key range to determine a maximum level for each endpoint;
   (c) determining a lower level limit as a function of the maximum level for each endpoint;
   (d) searching the key range between the ends of the key range and at, and above the lower level limit; and
   (e) counting the number of page pointers, encountered during the range search, residing on pages not exceeding the lower level limit.

17. The method of claim 16 and further comprising the step of identifying a point of divergence of the searching of the endpoints of the key range such that the search follows different paths from the point of divergence.

18. The method of claim 17 wherein the key range search is divided into two searches, defined by the two paths from the point of divergence and the ends of the key range.

19. The method of claim 18 wherein the two searches each proceed from the respective ends of the key range toward the middle of the key range until they reach the point of divergence.

20. The method of claim 19 and further comprising the step of initiating a pair of parallel tasks to perform the two searches, one task assigned to each search.

21. A method of estimating the number of keys in a key range over an index wherein the index is stored in page form, said pages having page pointers to other pages in the index, the method, comprising the steps of:
   (a) defining a left endpoint key and a right endpoint key of the key range;
   (b) determinig a lower level limit;
   (c) searching the key range between the endpoints of the key range, but not below the lower level limit;
   (d) counting the number of page points, encountered during the search of the key range; and
   (e) multiplying the number page points counter by an average number of keys per page value associated with said index to obtain an estimate of the number of keys in the index.

* * * * *